United States Patent [19]

Kovalevich

[11] 4,398,334

[45] Aug. 16, 1983

[54] DUCT WORK CLIP INSTALLER AND CRIMPER

[76] Inventor: Edward W. Kovalevich, 3813 High St., Camden, N.J. 08110

[21] Appl. No.: 297,690

[22] Filed: Aug. 31, 1981

[51] Int. Cl.[3] .......... B23P 11/00

[52] U.S. Cl. .......... 29/243.5; 29/243.56; 29/283.5; 72/211

[58] Field of Search .......... 29/243.5, 243.56, 243.57, 29/243.58, 283.5; 72/210, 211

[56] References Cited

U.S. PATENT DOCUMENTS

| | | | |
|---|---|---|---|
| 1,878,622 | 9/1932 | Deacon et al. | 29/243.5 |
| 2,889,618 | 6/1957 | Jarvis et al. | 29/243.5 |
| 3,513,678 | 5/1970 | Meyer | 72/211 |
| 3,771,482 | 11/1973 | Thompson | 29/243.5 |

*Primary Examiner*—James L. Jones, Jr.
*Attorney, Agent, or Firm*—Duffield & Lehrer

[57] ABSTRACT

A hand tool for installing clips to abutting edges of ducts and for crimping the clips to secure the ducts together is comprised of a rectangularly shaped base plate including pairs of opposed rollers mounted thereon with their axes perpendicular to the plate. A gap between the rollers is approximately the same size as the width of the combined edges being secured together. A raised pusher member pushes a clip which is resting on the plate into place and the same is crimped by the rollers when the tool is drawn back. A handle is located on the reverse side of the plate for manually moving the tool.

9 Claims, 6 Drawing Figures

DUCT WORK CLIP INSTALLER AND CRIMPER

BACKGROUND OF THE INVENTION

The present invention is directed toward a hand tool and more particularly toward a hand tool for installing clips to abutting edges of ducts and for crimping the clips to secure the ducts together.

As is well known in the art, duct work is utilized in many different types of installations for air conditioning, ventilation systems and the like. A common type of duct system utilized today is comprised of sections of rectangularly shaped tubular members having flanges extending totally around the peripheral edges thereof. Sections of the duct work are joined together by mating the flanges and by then bolting the flanges together and/or by applying clips on the flanges to maintain the same together.

The clips which are presently used to fasten the flanges together are elongated channel-shaped sheet metal members having a length of approximately five inches. They are conventionally installed by manually placing them over the adjoining edges of the duct work around the flanges and then hammering them into place. The clips are then further hammered in order to crimp the sides of the clips around the flanges.

The conventional method of installing the clips has not proven to be satisfactory. It has been found that the clips cannot be uniformly and adequately crimped using this prior art method. Furthermore, there are certain installations which due to space limitations make it impossible to reach the clips with a hammer, thereby making it impossible to crimp the same.

SUMMARY OF THE INVENTION

The present invention overcomes the problems of the prior art methods described above and provides the only means known to Applicant for installing and crimping such clips. The present invention is specifically directed toward a hand tool for installing clips to abutting edges of ducts and for crimping the clips to secure the ducts together and is comprised of a rectangularly shaped base plate including pairs of opposed rollers mounted thereon with their axes perpendicular to the plate. A gap between the rollers is approximately the same size as the width of the combined edges being secured together. A raised pusher member pushes a clip which is resting on the plate into place and the same is crimped by the rollers when the tool is drawn back. A handle is located on the reverse side of the plate for manually moving the tool.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
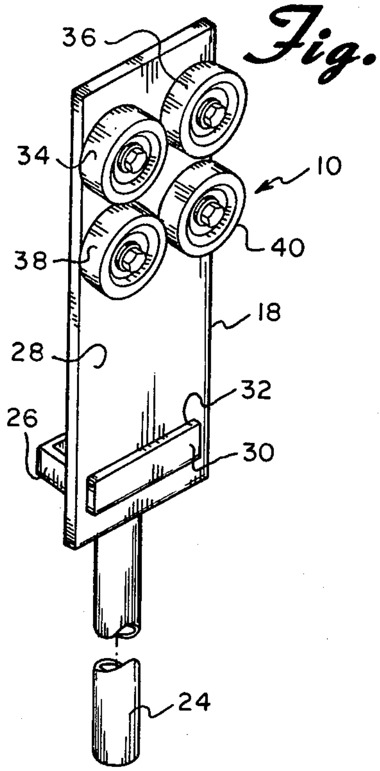
FIG. 1 is a front perspective view of a hand tool constructed in accordance with the principles of the present invention.
Figure 2:
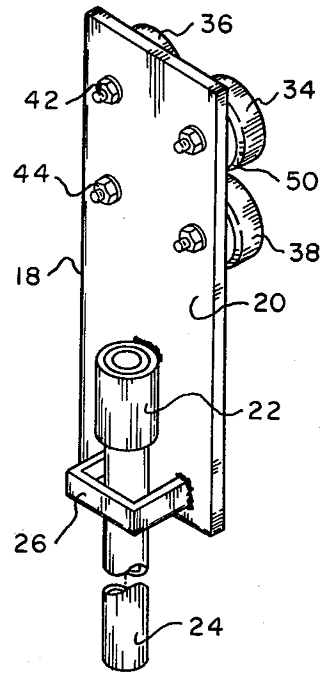
FIG. 2 is a rear perspective view of the tool.

Referring now to the drawings in detail wherein like reference numerals have been used throughout the various figures to designate like elements, there is shown in FIG. 1 a hand tool for installing clips to abutting edges of ducts and for crimping the clips to secure the ducts together constructed in accordance with the principles of the present invention and designated generally as 10. The clips which are intended to be installed by the tool 10 are shown at 12 in FIGS. 3, 5 and 6. And the ducts which are intended to be secured together are shown, by way of example, in FIG. 4 as elements 14 and 16.

The tool 10 is comprised essentially of a rigid flat planar and elongated base plate 18 which is preferably comprised of steel or other similar material. In the preferred embodiment, the base plate 18 is approximately twelve inches long, four inches wide and has a thickness of approximately one-fourth inch.

Mounted on the back surface 20 of the base plate 18 and adjacent the lower end thereof is a handle means comprised basically of two parts. The first part includes a pipe coupling member 22 which is welded to the surface 20 and which includes a threaded bore. A pipe section 24 having an externally threaded end thereon is adapted to be threaded into the coupling member 22. The pipe section 24 may, of course, be removed from the coupling member 22 whenever desired.

The handle comprised of the combined members 22 and 24 is normally utilized when the tool 10 is being used to install clips at locations which cannot easily be reached. In other words, the pipe section 24 functions as an extension. For more easily accessible locations, a second handle means 26 is provided. Handle 26 is a substantially U-shaped bracket welded to the back surface 20 and which can be easily grasped by a person's hand when the pipe section 24 is removed. The handle 26 is, of course, U-shaped so as to allow the pipe section 24 to be connected to the pipe coupler 22 whenever desired. This is by way of example only as the handle 26 may take other forms such as a solid block with an aperture therethrough for allowing the pipe section 24 to pass.

Welded to the front surface 28 of the base plate 18 is a pusher means in the form of a raised rectangularly shaped block 30. Block 30 is preferably also comprised of steel or similar material and has a front or leading edge 32 which is substantially perpendicular to the surface 28. The thickness of the block 30 is approximately one-fourth inch.

Also mounted on the front surface 28 of the base plate 18 and adjacent the upper end thereof are a plurality of rollers 34, 36, 38 and 40. The rollers are secured to the base plate 18 through the use of a plurality of bolts 42 and nuts 44 or by any other similar known means. Each of the rollers is substantially cylindrically shaped and is comprised of steel or some other similar hard material. Each wheel is mounted on the plate 18 so that the roller is rotatable about an axis perpendicular to the base plate. Preferably, the rollers 34–40 include ball bearing type mountings.

Figure 3:
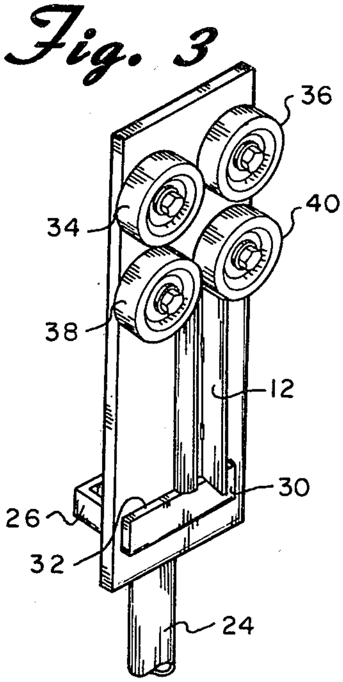
FIG. 3 is a view similar to FIG. 1 but showing a clip in position on the tool in preparation for installing the same.

The rollers are mounted in pairs with each roller of each pair lying on either side of the centerline of the base plate 18. In other words, rollers 34 and 36 comprise the first pair with the roller 34 mounted on the left side of the plate 18 as viewed in FIGS. 1 and 3 and roller 36 being mounted on the right side thereof. Similarly, roller 38 is mounted below roller 34 on the left side and roller 40 is opposite roller 38 on the right side. It should be noted that the two pairs of opposed rollers are shown as the preferred embodiment only. It is not beyond the scope of the present invention to utilize only one pair of opposed rollers or to use three or more pairs. Two pairs are, however, the preferred embodiment. It is required, however, that sufficient space be left between the lower pair of rollers, i.e. rollers 38 and 40 in the preferred embodiment and the edge 32 of the pusher 30 so as to allow a clip 12 to fit therein as shown in FIG. 3. The purpose for this will become more apparent hereinafter.

Figure 6:
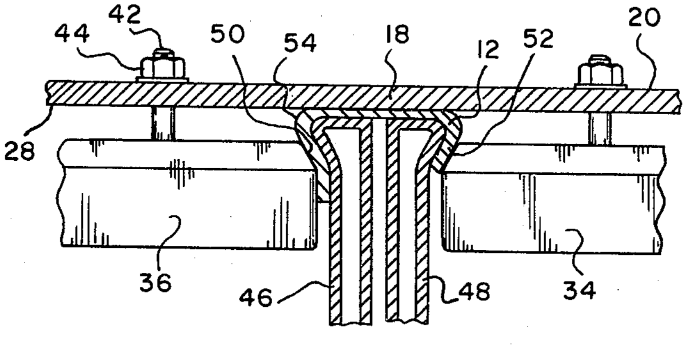
FIG. 6 is a cross-sectional view showing the manner in which the tool is utilized to crimp the clip to the flanges.

As shown most clearly in FIG. 6, each pair of rollers such as rollers 34 and 36 are mounted so as to leave a gap of approximately one-half inch between the outer peripheries of the rollers. This gap is substantially equal to the thickness of the flange portions 46 and 48 which are being joined together. This gap is, of course, in alignment with the gap between the rollers 38 and 40, overlies the centerline of the base plate 18 and is in alignment with the pusher block 30.

As can also be clearly seen from FIG. 6, each of the rollers is mounted so as to be spaced a slight distance from the front surface 28 of the base plate 18. In the preferred embodiment, this distance is approximately one-fourth of an inch. The inner edges of the periphery of each of the rollers is also chamfered such as shown at 50.

Figure 4:
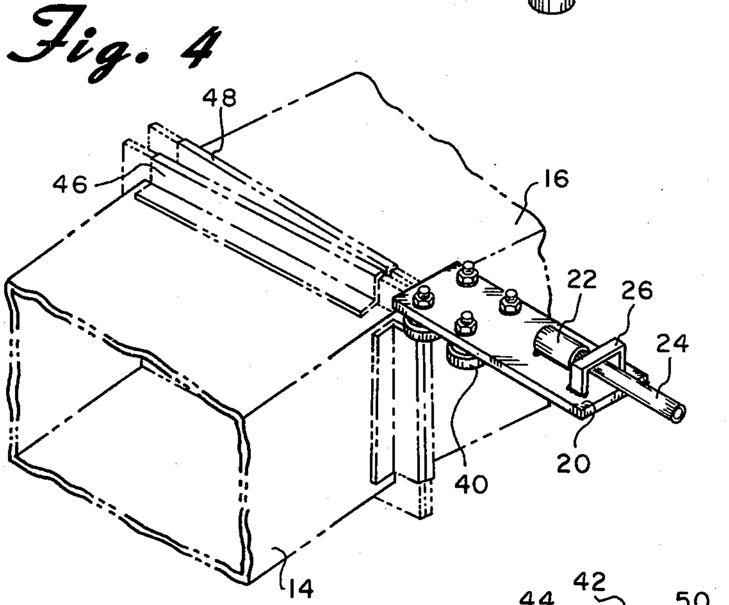
FIG. 4 is an illustration of the manner in which the tool is used to apply the clip to duct work flanges.
Figure 5:
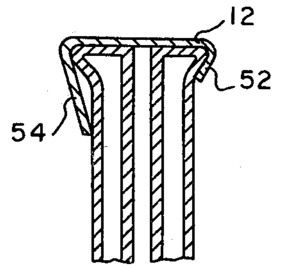
FIG. 5 is a cross-sectional view showing a clip applied to the flanges.

The tool 10 is used in the following manner. First, the leading ends of flanges such as flanges 46 and 48 of ducts 14 and 16 which are to be joined are forced together. This is normally relatively easily done by merely pushing on the ducts. The tool 10 is then inverted as shown in FIG. 4 and is pushed toward and onto the flanges 46 and 48 so that the combined flange moves into the gap between the pairs of opposed rollers. As the tool is moved, the rollers roll onto the flanges forcing them together. When the rollers 38 and 40 have reached the flanges, a clip 12 is placed into the position shown in FIG. 3 with its top surface against the front surface 28. As can also be seen from FIG. 3, the lower end of the clip 12 abuts against the edge 32 of the pusher means 30.

The clip 12 is initially manually held in place on the tool 10. As the tool is continually moved forwardly, i.e. to the left in FIG. 4, the leading end of the clip 12 pushes over the combined flanges 46 and 48. At this point, the operator no longer needs to hold the clip. Further movement of the tool in the forward direction pulls the flanges 46 and 48 together as the same are forced between the rollers and simultaneously slides the clip 12 into the desired position. It should be noted and as can be seen from FIGS. 3 and 5, the clip 12 includes one short side wall 52 which is normally bent or crimped inwardly and a longer side wall 54 which is not bent or crimped quite as much but is more perpendicular to the upper wall of the clip. In this condition, the clip can be forced relatively easily into place utilizing the tool 10.

After the clip is in its desired position, the tool 10 is drawn rearwardly, i.e. to the right as shown in FIG. 4. As this happens, the rollers are forced back over the side walls 52 and 54 of the clip and over the flanges 46 and 48 as shown in FIG. 6. As this occurs, the clip is crimped. More particularly, the opposed rollers bend the side wall 54 of the clip 12 so as to conform to the periphery of the rollers. The clip 12 is now firmly in place and securely holding the flanges 46 and 48 and thereby the ducts 14 and 16 together.

The overall depth of the tool 10 from the upper surface of the handle 26 to the upper surfaces of the rollers is preferably less than three inches. Thus, even when the duct work is located against a wall or near a ceiling with only a few inches of space remaining, the present too can be used to both apply and crimp the flange joining clips thereto.

The present invention may be embodied in other specific forms without departing from the spirit or essential attributes thereof and accordingly, reference should be made to the appended claims rather than to the foregoing specification as indicating the scope of the invention.

I claim:

1. A hand tool for installing clips to abutting edges of ducts and for crimping the clips to secure the ducts together comprising:

a rigid flat planar and elongated base plate having a front surface and a back surface;

handle means mounted on said back surface adjacent one end of said base plate;

a raised pusher means mounted on the front surface adjacent said one end of said base plate;

a pair of opposed rollers rotatably mounted on the front surface adjacent the other end of said base plate, said rollers being rotatable about axes perpendicular to said base plate and being spaced from each other on either side of a substantial centerline of said front surface so as to leave a gap between the other peripheries of said rollers which gap overlies said centerline and in alignment with said pusher means.

2. The tool as claimed in claim 1 wherein said rollers are located a slight distance above said front surface.

3. The tool as claimed in claim 2 wherein said distance is approximately one-fourth of an inch.

4. The tool as claimed in claim 3 wherein said pusher means has a height of approximately one-fourth of an inch.

5. The tool as claimed in claim 1 wherein said gap is approximately one-half of an inch.

6. The tool as claimed in claim 1 wherein each of said rollers is substantially cylindrically shaped and includes a chamfer on the outer surface adjacent the lower end thereof.

7. The tool as claimed in claim 1 further including a second pair of opposed rollers, said second pair being substantially the same as said first mentioned pair and being similarly mounted on said front surface.

8. The tool as claimed in claim 1 wherein said handle means includes a coupling member mounted on said back surface and an elongated rod adapted to be releasably connected to said coupling member.

9. The tool as claimed in claim 1 wherein said handle means includes a member extending from said back surface so as to be grasped by a person's hand and including an opening therethrough in substantial alignment with said centerline.

* * * * *